US010638421B2

(12) United States Patent
Di Marco et al.

(10) Patent No.: US 10,638,421 B2
(45) Date of Patent: Apr. 28, 2020

(54) METHOD FOR OPERATING A CAPILLARY NETWORK GATEWAY

(71) Applicant: Telefonaktiebolaget LM Ericsson (publ), Stockholm (SE)

(72) Inventors: Piergiuseppe Di Marco, Sollentuna (SE); Anna Larmo, Espoo (FI); Francesco Militano, Stockholm (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 70 days.

(21) Appl. No.: 16/061,440

(22) PCT Filed: Dec. 30, 2015

(86) PCT No.: PCT/EP2015/081432
§ 371 (c)(1),
(2) Date: Jun. 12, 2018

(87) PCT Pub. No.: WO2017/114576
PCT Pub. Date: Jul. 6, 2017

(65) Prior Publication Data
US 2019/0320386 A1    Oct. 17, 2019

(51) Int. Cl.
*H04W 52/02* (2009.01)
*H04W 52/14* (2009.01)
(Continued)

(52) U.S. Cl.
CPC ..... *H04W 52/0206* (2013.01); *H04L 43/0894* (2013.01); *H04W 24/08* (2013.01); *H04W 52/14* (2013.01); *H04W 88/16* (2013.01)

(58) Field of Classification Search
CPC . H04W 52/0206; H04W 24/08; H04W 52/14; H04W 88/16; Y02D 70/144; Y02D 70/21; Y02D 70/24
See application file for complete search history.

(56) References Cited

U.S. PATENT DOCUMENTS

2011/0066750 A1* 3/2011 Cochard ............... H04W 40/12
709/232
2011/0256826 A1* 10/2011 Ode .................. H04B 7/15535
455/7
(Continued)

FOREIGN PATENT DOCUMENTS

EP    2207277 A1    7/2010
WO    2015126303 A1    8/2015

OTHER PUBLICATIONS

3GPP TR 22.888 V12.0.0, 3rd Generation Partnership Project; Technical Specification Group Services and System Aspects; Study on enhancements for Machine-Type Communications (MTC) (Year: 2013).*

*Primary Examiner* — Un C Cho
*Assistant Examiner* — Peter K Mak
(74) *Attorney, Agent, or Firm* — Sage Patent Group (57) ABSTRACT

Method for operating a capillary network gateway (100-1), wherein the capillary network gateway (100-1) comprises an interface to a base station (103) of a cellular network for connecting the capillary network gateway (100-1) to a mobile telecommunication network and an interface for connecting at least one machine device (101-1, 101-2, 101-3) via at least one radio connection (107) to the capillary network gateway (100-1), comprising the steps of determining (S101), by the capillary network gateway (100-1), a condition to switch into a power-saving mode; instructing (S102) the at least one machine device (101-3) to associate to a further capillary network gateway (100-2), if the condition is fulfilled; and connecting (S103) the capillary network gateway (100-1) to a further capillary network gateway (100-2) via a radio connection.

16 Claims, 7 Drawing Sheets

(51) Int. Cl.
*H04W 24/08* (2009.01)
*H04W 88/16* (2009.01)
*H04L 12/26* (2006.01)

(56) References Cited

U.S. PATENT DOCUMENTS

| | | | |
|---|---|---|---|
| 2012/0002551 A1* | 1/2012 | Lampe | H04W 52/0229 370/241 |
| 2013/0010621 A1* | 1/2013 | Yoshiuchi | H04W 40/08 370/252 |
| 2013/0142059 A1* | 6/2013 | Di Girolamo | H04L 12/66 370/252 |
| 2015/0156715 A1* | 6/2015 | Jeanne | H04W 52/0206 370/311 |

* cited by examiner

METHOD FOR OPERATING A CAPILLARY NETWORK GATEWAY

TECHNICAL FIELD

The present invention relates to a method for operating a capillary network gateway, a capillary network gateway and a machine device.

BACKGROUND

A currently popular vision of the future development of the communication in cellular networks comprises huge numbers of small autonomous devices, which typically more or less infrequently, e.g. once per week to once per minute, transmit and receive only small amounts of data or are polled for data. It is assumed that these devices are not to be associated with humans, but are rather sensors or actuators of different kinds, which communicate with application servers, which configure the devices and receive data from them, within or outside of the cellular network. Hence, this type of communication is referred to as Machine Type Communication (MTC).

The MTC related work in 3GPP has focused on MTC devices directly connected to the cellular network via the radio interface of the cellular network. However, a more prevalent scenario is that most MTC devices connect to the cellular network via a gateway. In this scenario, the gateway acts like a user equipment (UE) towards the cellular network while maintaining a local network that is typically based on a short-range radio (SRR) technology towards the MTC devices.

Such a local network, which extends the range of the cellular network to other radio technologies, is denoted capillary network and the gateway connecting the capillary network to the cellular network is referred to as a capillary network gateway (CGW). Radio technologies that are expected to be common in capillary networks include e.g. IEEE 802.15.4 (e.g. with 6LoWPAN or ZigBee as the higher layers), Bluetooth Low Energy (BLE) or protocols in the IEEE 802.11 family (i.e. Wi-Fi).

The CGW can be under the control of the operator of the cellular network irrespective of whether the cellular network operator or some other party, such as the owner/operator of the capillary network, owns the CGW.

Low power operation is a critical requirement in the design of protocol solutions for SRR technologies.

The classic design approach for SRR includes two classes of devices. A first class are full functionalities devices (FFDs) with high computational capabilities and responsibilities, not subject to energy constraints, e.g. LAN access points (APs) in Wi-Fi, PAN coordinators in ZigBee, and master devices in BLE piconets. These devices are typically always on. A second class are reduced functionalities devices (RFDs) with low capabilities and responsibilities, typically mobile and battery powered with energy constraints, e.g., LAN stations (STAs), PAN nodes, and BLE slave devices. In order to save energy, these devices might be turned off while not operating.

Many algorithms have been proposed to reduce the duty cycle of RFDs so that the battery lifetime is maximized and have been included in the various SRR standards (IEEE 802.11, IEEE 802.15.4, BLE). This is typically achieved by delegating operations and functionalities to the FFDs, which do not implement duty-cycling operations.

In the context of capillary networks, there is a large number of CGWs between the SRR network and the cellular network. CGWs are often located close to each other, thus causing a wide overlap among the SRR communication ranges and, therefore, a high degree of redundant resources.

A first problem is the network energy consumption. CGWs are often continuously switched on to act as FFDs for the SRR network, thus consuming a lot of energy, even if not transmitting. The yearly amount of energy for operating capillary networks sums up considerably. In some cases the CGW may be battery based, so that energy saving is crucial.

A second aspect is related to the deployment. CGWs are typically installed once and work for long time without moving them. By doing so, the deployment should be redundant to accommodate for worst-case presence and traffic conditions of RFDs ("deploy and forget" approach). However, some of the CGWs are not needed or used for normal operations.

Finally, a dense CGW deployment causes interference and increased contention level in the downlink, with negative effects on the network performance. Even if the total downlink traffic is fixed, each CGW sends beacons and control messages that increase the probability of back-offs and collisions.

SUMMARY

It is an object of the present invention to provide a method and capillary network gateway that are able to reduce energy consumption.

This object is solved by subject matter according to the independent claims. Preferred embodiments are subject of the dependent claims, the description and the figures.

According to a first aspect this object is solved by a method for operating a capillary network gateway, wherein the capillary network gateway comprises an interface to a base station of a cellular network for connecting the capillary network gateway to a mobile telecommunication network and an interface for connecting at least one machine device via at least one radio connection to the capillary network gateway, comprising the steps of determining, by the capillary network gateway, a condition to switch into a power-saving mode; instructing the at least one machine device to associate to a further capillary network gateway, if the condition is fulfilled; and connecting the capillary network gateway to a further capillary network gateway via a radio connection.

In a preferred embodiment of the method, the condition is based on measuring a channel utilization of the capillary network gateway.

In a further preferred embodiment of the method, channel utilization is determined on the basis of averaging slot utilization over a predetermined time period.

In a further preferred embodiment of the method, the condition is based on determining if the machine device associated to the capillary network gateway is able to be associated to the further capillary network gateway.

In a further preferred embodiment of the method, the capillary network gateway measures a received field intensity of the of radio connection of the machine device and/or the further capillary network gateway to determine if the machine device is able to be associated to the further capillary network gateway.

In a further preferred embodiment of the method, the capillary network gateway receives a message from the machine device indicating a received field intensity of the radio connection of the further capillary network gateway to determine if the machine device is able to be associated to the further capillary network gateway.

In a further preferred embodiment of the method, a disconnect message is transmitted to the machine device for instructing the machine device to associate to the further capillary network gateway.

In a further preferred embodiment of the method, the machine device is associated to the further capillary network gateway for a probing phase before disconnecting the machine device from the capillary network gateway.

In a further preferred embodiment of the method, the capillary network gateway is switched into a power-saving mode.

In a further preferred embodiment of the method, the capillary network gateway is switched into a regular power mode if channel utilization of the further capillary network gateway is above a predefined threshold value.

In a further preferred embodiment of the method, the capillary network gateway is switched into a regular power mode if the minimum of the average received field intensity among machine devices associated to the further capillary network gateway in a predefined period is lower than a predefined threshold value.

In a further preferred embodiment of the method, the capillary network gateway receives an external trigger signal for determining the condition.

In a further preferred embodiment of the method, the capillary network gateway disconnects from the base station of the mobile telecommunication network. The other option is the low power connection and should also be covered According to a second aspect this object is solved by a capillary network gateway comprising an interface to a base station of a cellular network for connecting the capillary network gateway to a mobile telecommunication network and an interface for connecting at least one machine device via at least one radio connection to the capillary network gateway, configured to determine a condition to switch into a power-saving mode; instruct the at least one machine device to associate to a further capillary network gateway, if the condition is fulfilled; and connect the capillary network gateway to a further capillary network gateway via a radio connection.

An apparatus for implementing a capillary network gateway comprising an interface to a base station of a cellular network for connecting the capillary network gateway to a mobile telecommunication network and an interface for connecting at least one machine device via at least one radio connection to the capillary network gateway is provided, the apparatus comprising a processor and a memory, said memory containing instructions executable by said processor whereby said apparatus is operative to determine a condition to switch into a power-saving mode; instruct the at least one machine device to associate to a further capillary network gateway, if the condition is fulfilled; and connect the capillary network gateway to a further capillary network gateway via a radio connection.

A terminal for implementing a capillary network gateway comprising an interface to a base station of a cellular network for connecting the capillary network gateway to a mobile telecommunication network and an interface for connecting at least one machine device via at least one radio connection to the capillary network gateway is provided, the terminal comprising a determination module to determine a condition to switch into a power-saving mode; an instruction module for instructing the at least one machine device to associate to a further capillary network gateway, if the condition is fulfilled; and an connection module for connecting the capillary network gateway to a further capillary network gateway via a radio connection.

In a preferred embodiment of the capillary network gateway, the condition is based on measuring a channel utilization of the capillary network gateway.

In a further preferred embodiment of the capillary network gateway, the capillary network gateway is configured to determine the channel utilization on the basis of averaging slot utilization over a predetermined time period.

In a preferred embodiment of the capillary network gateway, the condition is based on determining if the machine device associated to the capillary network gateway is able to be associated to the further capillary network gateway.

In a preferred embodiment of the capillary network gateway, the capillary network gateway is configured to measure a received field intensity of the of radio connection of the machine device and/or the further capillary network gateway to determine if the machine device is able to be associated to the further capillary network gateway.

In a preferred embodiment of the capillary network gateway, the capillary network gateway is configured to receive a message from the machine device indicating a received field intensity of the radio connection of the further capillary network gateway to determine if the machine device is able to be associated to the further capillary network gateway.

In a preferred embodiment of the capillary network gateway, the capillary network gateway is configured to transmit a disconnect message to the machine device for instructing the machine device to associate to the further capillary network gateway.

In a preferred embodiment of the capillary network gateway, the capillary network gateway is configured to associate the machine device for a probing phase before disconnecting the machine device from the capillary network gateway.

In a preferred embodiment of the capillary network gateway, the capillary network gateway is configured to switch into a power-saving mode.

In a preferred embodiment of the capillary network gateway, the capillary network gateway is configured to switch into a regular power mode if channel utilization of the further capillary network gateway is above a predefined threshold value.

In a preferred embodiment of the capillary network gateway, the capillary network gateway is configured to switch into a regular power mode if the minimum of the average received field intensity among machine devices associated to the further capillary network gateway in a predefined period is lower than a predefined threshold value.

In a preferred embodiment of the capillary network gateway, the capillary network gateway is configured to receive an external trigger signal for determining the condition.

In a preferred embodiment of the capillary network gateway, the capillary network gateway is configured to disconnect from the base station of the mobile telecommunication network.

According to a third aspect this object is solved by a machine device for associating with a capillary network gateway via at least one radio connection, configured to transmit a message from the machine device to the capillary network gateway that indicates a received field intensity of a further capillary network gateway to determine if the machine device is able to be associated to the other capillary network gateway.

An apparatus for associating with a capillary network gateway via at least one radio connection is provided, the apparatus comprising a processor and a memory, said memory containing instructions executable by said processor whereby said apparatus is operative to transmit a message from the machine device to the capillary network gateway that indicates a received field intensity of a further capillary network gateway to determine if the machine device is able to be associated to the other capillary network gateway.

A terminal for associating with a capillary network gateway via at least one radio connection is provided, the terminal comprising a transmission module to transmit a message from the machine device to the capillary network gateway that indicates a received field intensity of a further capillary network gateway to determine if the machine device is able to be associated to the other capillary network gateway.

According to a fourth aspect this object is solved by a computer program product loadable into a memory of a capillary network gateway, comprising software code portions for performing the steps according to the method of the first aspect, when said computer program product is run on capillary network gateway.

BRIEF DESCRIPTION OF THE DRAWINGS

Further embodiments may be described with respect to the following Figures, in which.

DETAILED DESCRIPTION OF EMBODIMENTS

Figure 1:
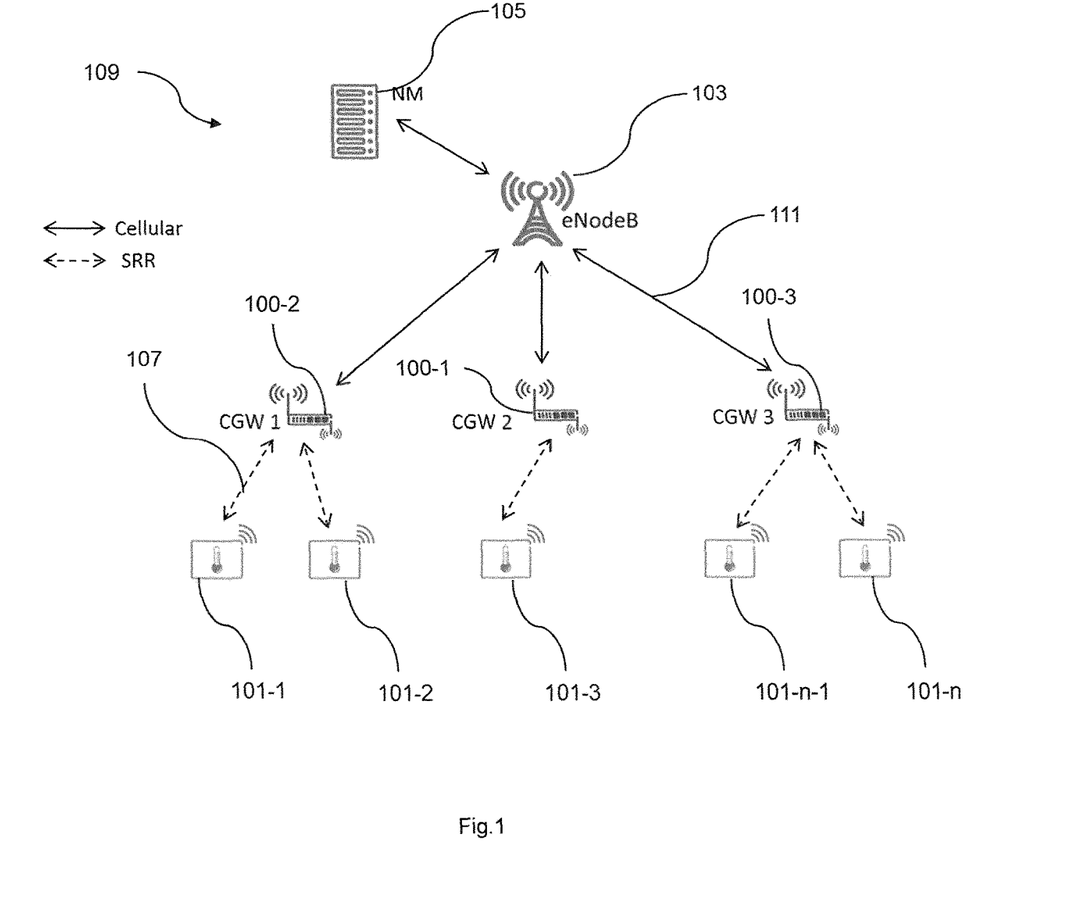
FIG. 1 shows an example of a capillary network.

FIG. 1 shows an example of a capillary network 109. The capillary network 109 comprises several capillary network gateways 100-1, 100-2 and 100-3. Each capillary network gateway 100-1, 100-2 and 100-3 comprises an interface to a base station 103 of a cellular access network 111 for connecting to a mobile telecommunication network and an interface for connecting machine devices 101-1, . . . , 101-n via a radio connection 107 to the corresponding capillary network gateway 100-1, 100-2 or 100-3. The radio connection 107 may be a short range radio connection. The capillary network gateways 100-1, 100-2 and 100-3 act as a network node equipped for interfacing with another network that uses different protocols. For example, the capillary network gateways 100-1, 100-2 and 100-3 implement 3GPP specifications for cellular connectivity as well as IEEE 802.11 specifications for Wi-Fi connectivity as short range radio connectivity.

The capillary network gateways 100-1, 100-2 and 100-3 can be operated in a regular non-power-save mode (NPS-CGW) and a power-save mode (PS-CGW). In non-power-save mode, regular functionality of the capillary network gateways 100-1, 100-2 and 100-3 is provided. When operating in non-power-saving mode, the capillary network gateways 100-1, 100-2 and 100-3 operate, for example as a Wi-Fi access point, sending periodic beacons and serving one or more Wi-Fi stations, according to the existing IEEE 802.11 protocol.

In a power-save mode, only reduced functionality of the capillary network gateways 100-1, 100-2 and 100-3 is provided, like reduced bandwidth or connectivity. In this power-save mode, the capillary network gateways 100-1, 100-2 and 100-3 can be disconnected from the base station or keep only a low power connection. A low power connection to the base station 103 may be implemented by a discontinued connection modus like DRX (Discontinuous Reception) in which the capillary network gateway 100-1, 100-2, 100-3 transmits data only in a negotiated phase and turns off the receiver during the other time.

The base station 103 of the cellular network 111 can be an eNode B or a Node B and communicates with a network manager 105. The network manager 105 could be a function in the access network of a cellular network. As an example the network manager 105 could be part of an eNodeB or NodeB. It may also be possible that the network manager 105 is a function in the core network of a mobile telecommunication network. The machine devices 101-1 . . . 101-n can be sensors or actuators of different kinds, which communicate with application servers, which configure the machine devices 101-1, . . . , 101-n and receive data from them, within or outside of the cellular network 111. The machine devices 101-1 . . . 101-n may represent devices that sporadically transmit, receive, or are polled for small amounts of data. In the present disclosure, machine devices have been exemplified by non-manually operated sensor or actuator of different kinds, which communicate with application servers or similar network entities within or outside a cellular network.

In the example embodiment of FIG. 1 the machine devices 101-1 and 101-2 are associated to the capillary network gateway 100-2. The machine device 101-3 is associated to the capillary network gateway 100-1. Further machine devices 101-n-1 and 101-n are associated to the capillary network gateway 100-3. In this example of FIG. 1 all capillary network gateways 100-1, 100-2, 100-3 operate in a non-power-saving mode. In principle the number of machine devices 101-1, . . . , 101-n is not limited. Each capillary network gateway 100-1, 100-2 and 100-3 can have associated an arbitrary number of machine devices 101-1, . . . 101-n to which a communication via the radio connection 107 is established.

Figure 2:
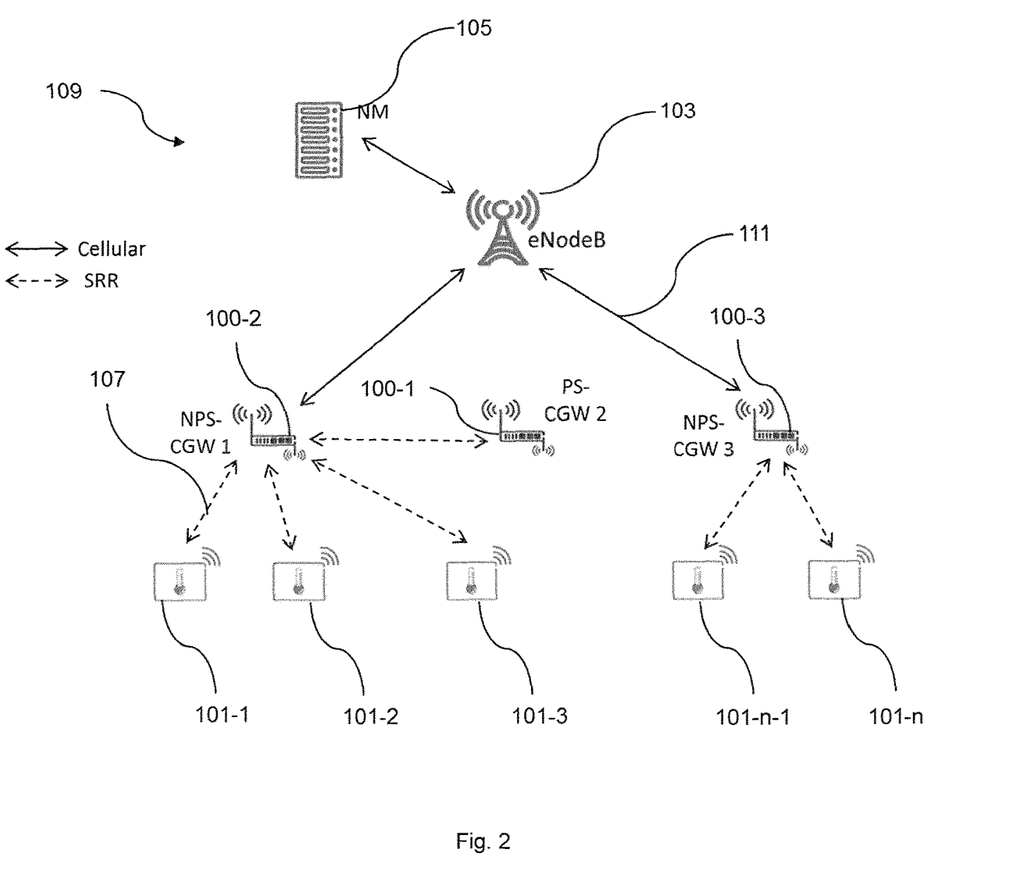
FIG. 2 shows an example of a capillary network with a gateway operating in a power-saving mode.

FIG. 2 shows an example of the capillary network 109 with the capillary network gateway 100-1 operating as a power-saving capillary network gateway and the capillary network gateways 100-2 and 100-3 operating as non-power-saving capillary network gateways.

In a non-power-saving mode the capillary network gateway 100-1 acts as a regular capillary network gateway. Before operating as a power-saving capillary network gateway the capillary network gateway 100-1 determines a condition to switch into a power-saving mode. The condition covers not only a measurement by the capillary network gateway but also a situation in which the capillary network gateway gets an indication from another node, e.g. from a base station of the cellular network or from a further capillary network gateway. The capillary network gateway can be connected to the further capillary network gateway, to which the machine device is associated to or to a different capillary network gateway. The condition to switch into a power-saving mode can be based on measuring the channel utilization, i.e., the percentage of time the channel is busy due to packet transmissions and/or the average received power from associated machine devices 101-3 and from a neighboring capillary network gateway 100-2 that is not in a power-saving mode. The condition to switch into a power-saving mode can also be triggered externally by a cellular network or cloud management entity which controls the capillary network gateways 100-1, 100-2 or 100-3.

If the determined condition is fulfilled, the machine device 101-3 is instructed to associate to the other capillary network gateway 100-2 and the previous capillary network gateway 100-1 is connected to the capillary network gateway 100-2 via a radio connection, like Bluetooth or Wi-Fi. The radio connection for connecting the capillary network gateway 100-1 to the other capillary network gateway 100-2 can be based on the same technology as for the machine device 101-3, e.g. Bluetooth or Wi-Fi. Then the capillary network gateway 100-1 is switched into the power-save mode. It may also be possible that the capillary network gateway 100-1 is connected to a non-power saving capillary network gateway 100-3 which is different to the capillary network gateway 100-2 to which the machine device 101-3 has been associated.

When being in power-save mode, the capillary network gateway 100-1 operates with a set of functionalities required for an end-user device in the short-range radio network 107, e.g. LAN station, and is able to perform additional operations, like associating to the capillary network gateway 100-2 that is in non-power-saving mode, turning on the radio for reception of beacon messages from the other capillary network gateway 100-2 or switching into non-power-saving mode either periodically or upon receiving a specific command from the other capillary network gateway 100-2.

As an optional behavior, the capillary network gateway 100-1 in power-saving mode may keep low power connectivity to the cellular network 111 and receive direct commands by the cellular network 111, like Device2Device (D2D) communication between the capillary networks. Further, the capillary network gateway 100-1 in power-saving mode can autonomously decide to turn the mode into non-power-saving after a time-out. If other conditions on the measurements are fulfilled, the capillary network gateway 100-1 in power-save mode can be commanded to switch back into non-power-save mode. It may also be possible that the capillary network gateway 100-1 enters a DRX mode.

Figure 3:
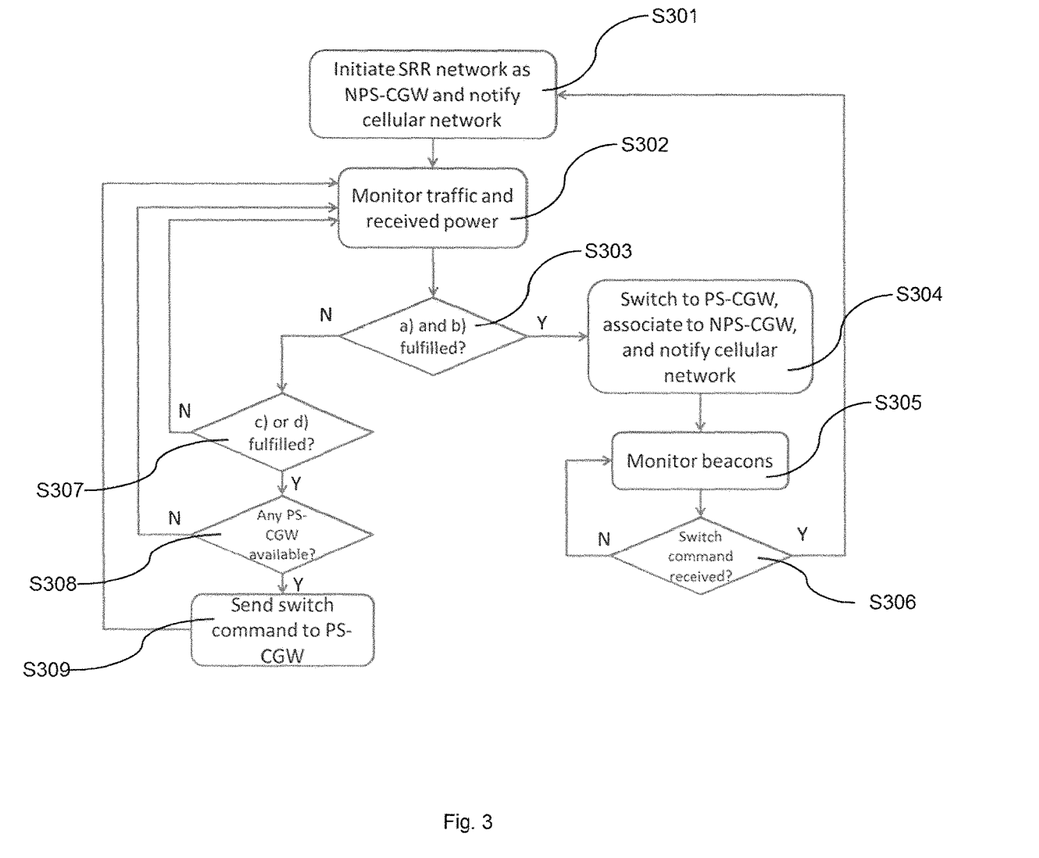
FIG. 3 shows a flow chart of an embodiment of the invention.

FIG. 3 shows a flow chart describing steps with regard to the situation depicted in FIG. 1 and FIG. 2. In step S301 the SRR network is initiated as non-power-saving gateway 100-1 and the cellular network is notified. This notification may be received and further managed by the Network manager 105 in the mobile telecommunication network. In step S302 traffic and received power, i.e. received field intensity, are monitored by the capillary network gateway 100-1. In step S303 it is tested whether the slot utilization averaged over a period T is lower than a threshold X1 as condition a) and/or associated devices are able to connect to an alternative capillary network gateway 100-2 in non-power-saving mode, e.g. capillary network gateway 100-2, as condition b). This step S303 may be executed in the capillary network gateway 100-1 or in any other node (e.g. eNode B or any management entity in the access or core network part of the mobile telecommunication network). Step S303 may also be executed in a function of a cloud management entity which controls the capillary network gateways 100-1, 100-2 or 100-3.

Condition a) is used to avoid handover of many devices to a new capillary network gateway 100-2, which is costly in terms of energy and creates traffic overhead. Condition b) is used to avoid potential loss of connections for associated machine devices 101-1, . . . , 101-n. If both conditions are satisfied simultaneously to trigger the switching procedure, a robust performance is achieved. However, at least only one condition a) or b) can be sufficient to trigger the switching procedure so that maximal power-saving is achieved.

Two methods can be used to guarantee that condition b) is fulfilled. In a first method the capillary network gateway 100-1 in non-power-saving mode collects reports from associated machine devices 101-3 regarding their received power or field intensity from neighboring capillary network gateways 100-2 or 100-3. In a second method the capillary network gateway 100-1 in non-power-saving mode estimates the connectivity options of associated machine devices 101-1, . . . , 101-n by combining local measurements on the received power or field intensity from the associated machine devices 101-3 and from the neighboring capillary network gateways 100-2 or 100-3.

If one or both conditions are fulfilled, the switching decision can be directly taken from the capillary network gateway 100-1 in step S304. The switching decision may also be taken by a function in the base station 103 or in any other node in the mobile telecommunication network and must be reported to the capillary network gateway 100-1. The switching procedure comprises broadcasting a disconnect message by the capillary network gateway 100-1 to all associated machine devices 100-3 in the short range radio network 107, an establishing of an association to the short range radio network 107 of the other capillary network gateway 100-2 by the capillary network gateway 100-1 and notifying the cellular network (e.g. the network manager 105 in the mobile telecommunication network).

It may also be possible that the capillary network gateway 100-1 stops sending association beacons to their associated devices which implicitly instruct the machine devices 100-3 to associate to a further capillary network gateway 100-2, 100-3.

Machine devices 101-3 that have been disconnected by the capillary network gateway 100-1 perform an association to the strongest remaining capillary network gateway 100-2 and continue their operation. The disconnect message is broadcast immediately to the associated machine devices or embedded in a beacon message. Optionally, the capillary network gateway 100-1 may give to the associated machine devices 101-3 the opportunity to connect to other capillary network gateways 100-2 or 100-3 in non-power-save mode before disconnecting. Capillary network gateways 100-2 or 100-3 may announce a probing phase with predetermined duration before disconnecting so that the machine devices 101-3 can report if there is any issue connecting to an alternative capillary network gateways 100-2 or 100-3.

Further, the decision of switching the power mode can be triggered by the cellular network or cloud management entity which controls the capillary network gateways 100-1, 100-2 or 100-3. This decision is communicated to the capillary network gateway 100-1. Further, the decision of switching the power mode can be requested by the capillary network gateway 100-1 to the cellular network or cloud management entity, which controls the capillary network gateways 100-1, 100-2 or 100-3. Once the network management entity approves the request, the capillary network gateway 100-1 goes to the next step of the switching procedure.

In step S305 the capillary network gateway 100-1 in power-save mode monitors beacon messages from other capillary network gateways 100-2 and 100-3 that could comprise a switch command. The beacon messages may be sent via the short range radio connection between the non-power saving capillary network gateway 100-2 and the power saving capillary network gateway 100-1. It may also be possible that the beacon messages may be provided over the cellular network to the power saving capillary network gateway 100-1. In step S306 it is tested if a switch command is included and received. If no switch command is received, the capillary network gateway 100-1 continues with step S305, in which it is again listened for beacon messages. If a switch command is received, the capillary network gateway 100-1 continues with step S301, by which the non-power-saving mode of the capillary network gateway 100-1 is re-established.

If conditions a) and/or b) are not fulfilled in step S302, the capillary network gateway 100-1 proceeds to step S307. In step S307 it is tested whether the slot utilization is higher than a threshold X2 as condition c) and/or the minimum of the average received power among associated machine devices in a period T is lower than a threshold P2 as condition d).

The condition c) is to avoid that the capillary network gateway 100-1 is overloaded. Condition d) is required to recover potential loss of connectivity for edge machine devices 101-1, 101-n. If the conditions c) and/or d) are not fulfilled, it is proceeded with step S302. If the conditions c) and/or d) are fulfilled, it is tested in step S308, if there is any power-saving cellular network gateway available.

If there is no power-saving cellular network gateway available, it is proceeded with step S302. If there is a power-saving cellular network gateway available, it is continued with step S309, in which a switch command is sent to the power-saving capillary network gateway 100-1 for switching into the non-power-saving mode. In consequence, the network or the capillary network gateway 100-2 in non-power-saving mode can command the capillary network gateway 100-1 in power-saving mode to switch into non-power-saving mode, if at least one or both conditions at the capillary network gateway 100-2 are fulfilled.

Once the switching procedure is decided, the capillary network gateway 100-1 disconnects from capillary network gateway 100-2. The capillary network gateway 100-1 turns its state into non-power-saving mode and starts advertising its presence again in the capillary network.

Figure 4:
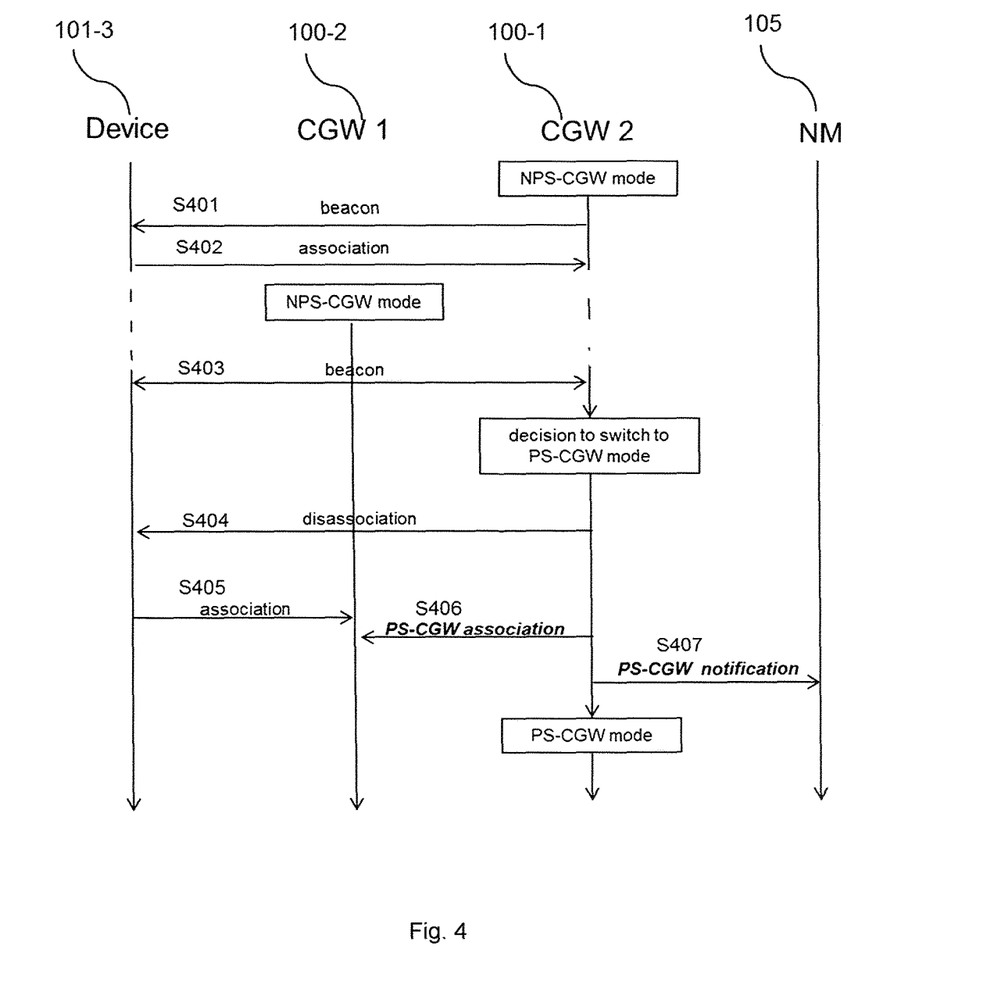
FIG. 4 shows a message flow diagram according to an embodiment of the invention.

FIG. 4 shows a message flow diagram for switching from a non-power-saving mode to a power-saving mode according to one embodiment of to invention. In step S401 a beacon message is transmitted from the capillary network gateway 100-1 to the machine device 101-3. In step S402 an association message is transmitted from the machine device 101-3 to the capillary network gateway 100-1. In step S403 a further beacon message is transmitted. Then it is decided to switch the capillary network gateway 100-1 into the power-saving mode according to conditions a) and/or b).

Thus, a disassociation message is transmitted from the network gateway 100-1 to the machine device 101-3 in step S404.

Then, in step S405 the machine device 101-3 sends an association message to the other capillary network gateway 100-2. In step S406 the capillary network gateway 100-1 sends an association message via the radio network to the other new capillary network gateway 100-2. Finally, in step S407 a notification message is sent to the network manager 105 of the cellular network.

Figure 5:
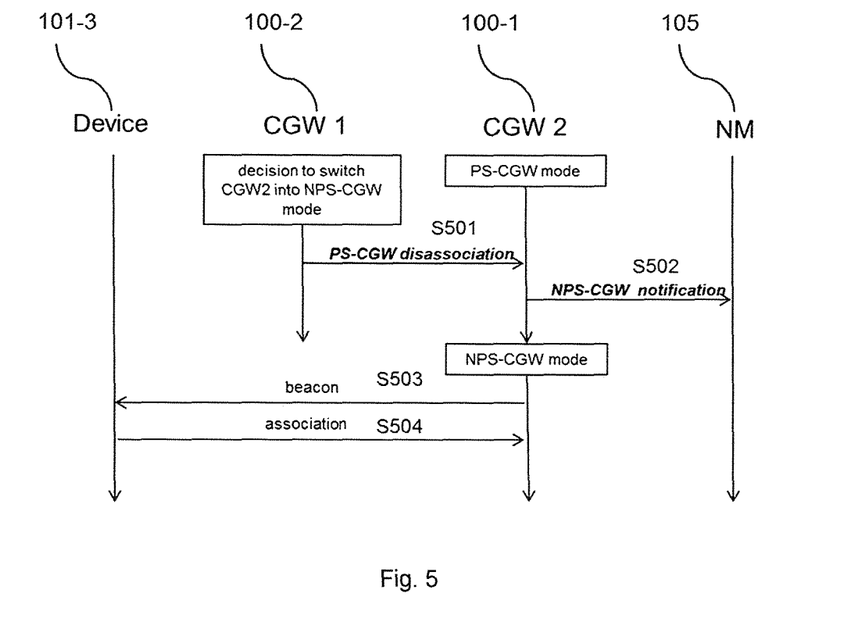
FIG. 5 shows a message flow diagram according to a further embodiment of the invention.

FIG. 5 shows a message flow diagram for switching from a power-saving mode to a non-power-saving mode according to one embodiment of the invention. When operating in power-saving mode the capillary network gateway 100-1 operates e.g. as a Wi-Fi station, listening for periodic beacons by the serving Wi-Fi access point.

After a decision to switch the capillary network gateway 100-1 from power-saving mode to a non-power-saving mode, e.g. upon verification of conditions c) and/or d), in step S501 a disassociation message is transmitted from the other capillary network gateway 100-2 to the capillary network gateway 100-1 over the radio network 107, which may be a short range radio network, to command a switch to the non-power-saving mode. In step S502 the capillary network gateway 100-1 sends a notification message to the network manager 105 of the cellular network. In step S503 a beacon message is transmitted from the capillary network gateway 100-1 to the machine device 101-3. In step S504 an association message is transmitted from the machine device 101-3 to the capillary network gateway 100-1. All messages can be derived by standard control messages with the addition of a flag, e.g., PS-CGW disconnect, in the application payload.

Figure 6:
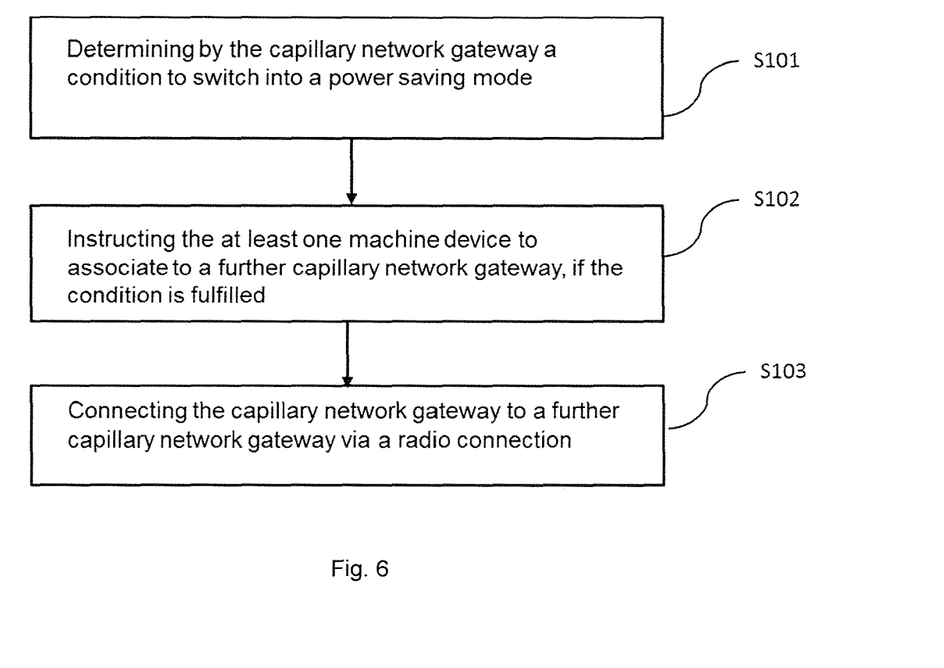
FIG. 6 shows a block diagram of a method according to an embodiment of the invention.

FIG. 6 shows a block diagram of a method for operating a capillary network gateway 100-1. The method comprises the step S101 of determining by the capillary network gateway 100-1, a condition to switch into a power-saving mode, the step S102 of instructing the at least one machine device 101-3 to associate to a further capillary network gateway 100-2, if the condition is fulfilled; and the step S103 of connecting S103 the capillary network gateway 100-1 to a further capillary network gateway 100-2 via a radio connection.

Figure 7:
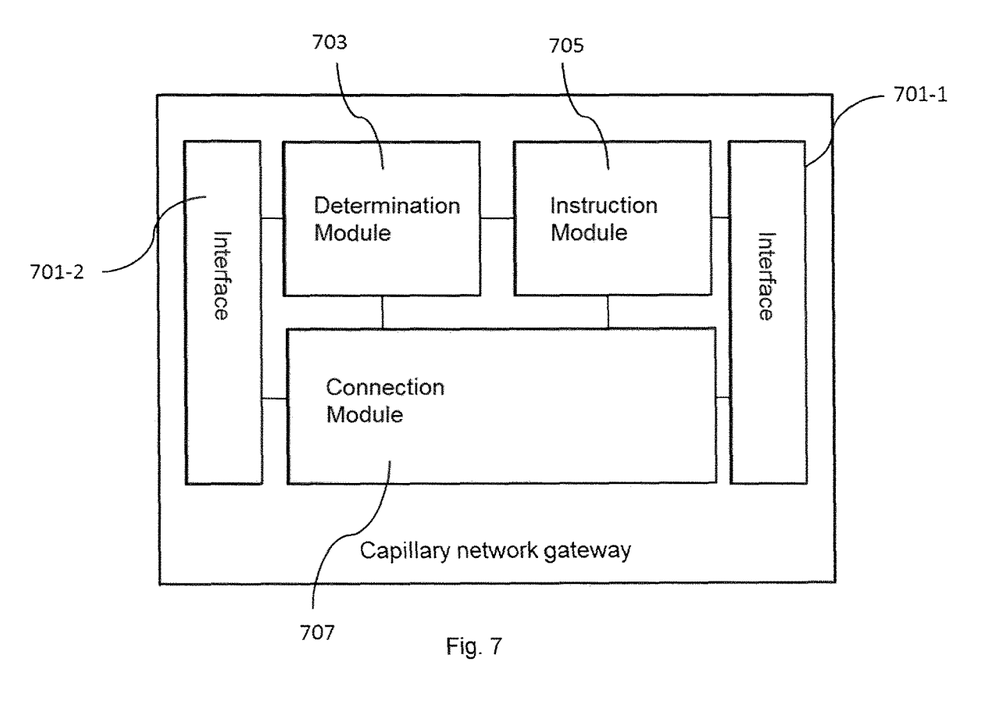
FIG. 7 shows a schematic view of a capillary network gateway.

FIG. 7 shows a schematic view of a terminal 700 for implementing a capillary network gateway 100-1. The terminal serves for implementing the capillary network gateway 100-1 and comprises an interface 701-1 to the base station 103 of the cellular network 111 for connecting the capillary network gateway 100-1 to a mobile telecommunication network and an interface 701-2 for connecting the machine devices 101-1, . . . 101-n via the radio connection 107 to the capillary network gateway 100-1.

The terminal 700 comprises a determination module 703 to determine a condition to switch into a power-saving mode; an instruction module 705 for instructing the machine device 101-3 to associate to a further capillary network gateway 100-2, if the condition is fulfilled; and a connection module 707 for connecting the capillary network gateway 100-1 to the further capillary network gateway 100-2 via a radio connection 107.

Figure 8:
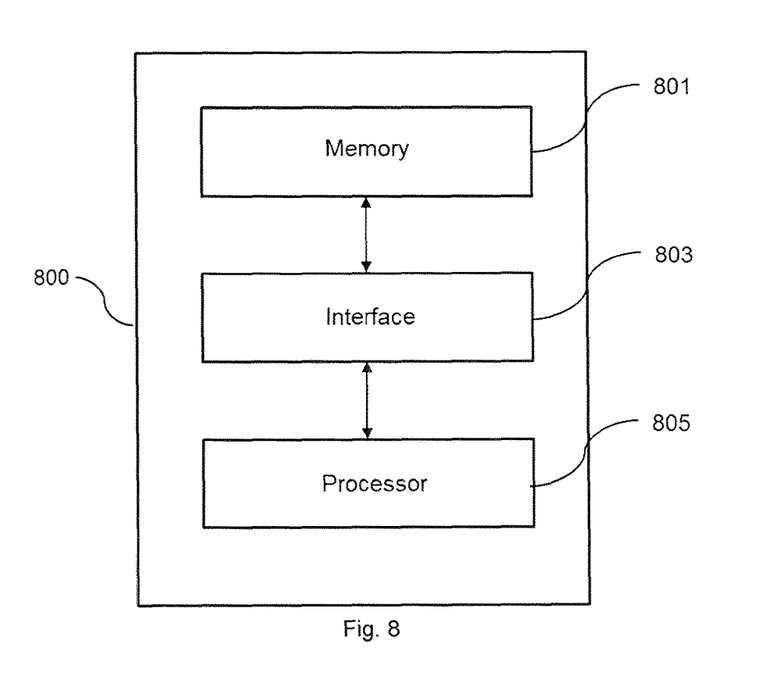
FIG. 8 shows a schematic view of a capillary network gateway implemented on a computer.

FIG. 8 shows the capillary network gateway 100-1 as a digital computer 800. The computer 800 can comprise a computer program that is loadable into the internal memory 801 of the digital computer 800, comprising software code portions for performing any of the aforementioned method steps when said computer program is run on the computer 800. A computer program maybe embodied as a computer program product stored on a carrier for loading into the internal memory. Alternatively or in addition, the computer program product may be downloaded to the computer 800.

The computer 800 is a device that can be programmed to carry out a set of arithmetic or logical operations automatically on the basis of software code portions. The computer 800 comprises the internal memory 801, such like a random access memory chip that is coupled by an interface 803, like an IO bus or a wireless transceiver, with a processor 805. The processor 805 is the electronic circuitry within the computer 800 that carries out the instructions of the software code portions by performing the basic arithmetic, logical, control and input/output (I/O) operations specified by the instructions. To this end the processor 805 accesses the software code portions that are stored in the internal memory 801.

The capillary network gateway 100-1 can be implemented by a single computer. In general, the capillary network gateway 100-1 is realized by an active electronic device that is attached to a network, and is capable of creating, receiving, or transmitting information over a communication channels.

Figure 9:
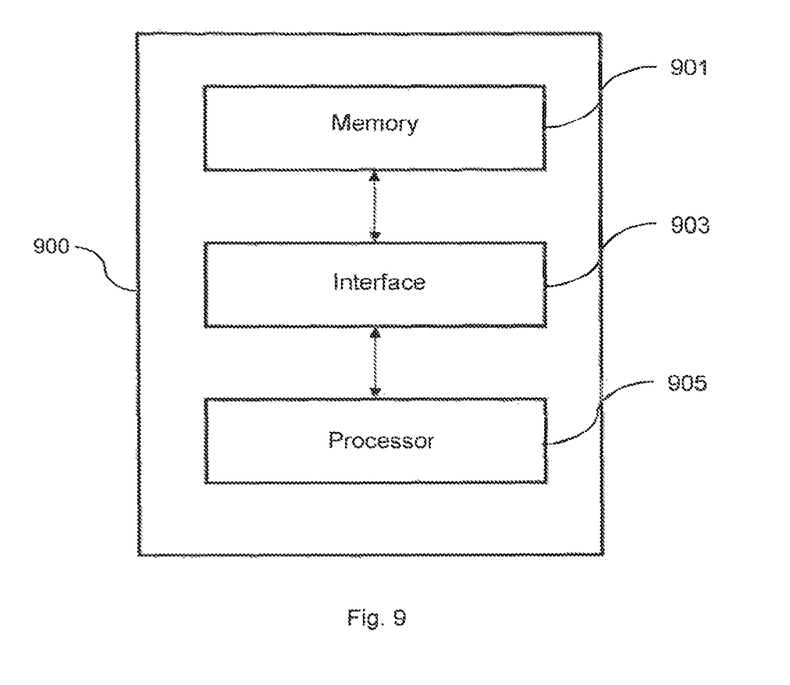
FIG. 9 shows a schematic view of a machine device according to an embodiment of the invention.

FIG. 9 depicts a machine device 900 for associating with a capillary network gateway 100-1 via at least one radio connection 107. The machine device 900 comprises an interface 903 which is configured to transmit a message from the machine device 900 to the capillary network gateway 100-1. The message indicates a received field intensity of a further capillary network gateway 100-2 to determine if the machine device 900 is able to be associated to the other capillary network gateway 100-2. The machine device further comprises a memory 901 which is adapted to store a computer program which, when executed on a processor 905 of the machine device 900, provides the message to the interface 903. The interface 903 is further adapted to receive signalling from neighboring capillary network gateways 100-2, 100-3. The signalling is analyzed by the processor 905 to determine a field intensity of the further capillary network gateway 100-2 or 100-3. This determined field intensity is transmitted by a message via the interface 903 to the capillary network gateway 100-1 to allow the capillary network gateway 100-1 to determine if the machine device 900 is able to be associated to the measured other capillary network gateway 100-2, 100.3.

The decision of mode switch of the capillary network gateway 100-1 can be triggered by the cellular network or cloud management entity, which controls the capillary network gateways 100-1, 100-2 and 100-3 and is communicating to capillary network gateway 100-1.

The decision of mode switch of the capillary network gateway 100-1 can be requested by the capillary network gateway 100-1 to the cellular network or cloud management entity, which controls the network gateways 100-1, 100-2 and 100-3. Once the network management entity approves the request, the capillary network gateway 100-1 goes to the next step of the switching procedure.

The decision of mode switch of the capillary network gateway 100-1 can be requested by the capillary network gateway 100-2 to the cellular network or cloud management entity, which controls the network gateways 100-1, 100-2 and 100-3. Once the network management entity approves the request, the network informs the capillary network gateway 100-1 to execute the next step of the switching procedure.

The decision of mode switch of the capillary network gateway 100-1 can be directly taken by capillary network gateway 100-1 or capillary network gateway 100-2.

The method implements a coordinated sleeping scheme among capillary network gateway 100-1, 100-2 and 100-3 to reduce the contention level for the downlink traffic and improve the energy efficiency, while keeping a guaranteed uplink performance, like CGW availability or capacity. In this cross-technology solution the capillary network gateway 100-1 measures conditions at short-range radio side and/or receives instructions from the cellular side. Then the capillary network gateway 100-1 takes combined actions for both short-range side, i.e. create own network/associate with neighboring network, and for cellular side, i.e. connect/disconnect.

The method realizes a new behavior of the capillary network gateway 100-1 that temporary acts as reduced functionality device (RFD) in the short-range radio network that is connected to another capillary network gateway 100-2. This behavior allows the capillary network gateway 100-1 to save energy and reduce signaling when its role as a capillary network gateway is not needed.

In terms of energy saving the capillary network gateways can jointly reduce short-range radio and cellular idle cycles thus saving energy and reducing the impact on energy consumption. Flexibility is increased, since the number of active capillary network gateways is automatically tuned depending on traffic conditions and/or network availability.

In a classic cellular network, small cells may decide to schedule sleep times according to e.g. traffic conditions and macro entities may request some base stations to go to sleep. However, compared to regular sleepy base stations, the advantage of the proposed sleepy capillary network gateway is that they associate to another capillary network gateway and can still be reachable in downlink by short-range connectivity. The capillary network gateway in power-save mode monitors changes in the network conditions and receives direct wakeup requests from the other capillary network gateway.

The proposed behavior for capillary network gateway is different to the behavior of relays in the network. In a relay network, a device may autonomously decide to save energy by connecting to a peer relay instead of connecting directly to the cellular network. For capillary network gateways, such a decision affects the behavior of its associated devices. Therefore, it is conditioned to the capability for the resulting network to remain operational.

In the drawings and specification, there have been disclosed exemplary embodiments of the invention. However, many variations and modifications can be made to these embodiments without substantially departing from the principles of the present invention. Accordingly, although specific terms are employed, they are used in a generic and descriptive sense only and not for purposes of limitation.

The invention is not limited to the examples of embodiments described above and shown in the drawings, but may be freely varied within the scope of the appended claims.

ABBREVIATIONS

Abbreviation Explanation
AP Access point
CGW Capillary network gateway
D2D Device to device
FFD Full functionality device
MTC Machine type communications
NPS-CGW Non-power-save capillary gateway
PS-CGW Power-save capillary gateway
RFD Reduced functionality device
SRR Short-range radio

The invention claimed is:

1. A method for operating a capillary network gateway, wherein the capillary network gateway comprises an interface to a base station of a cellular network for connecting the capillary network gateway to a mobile telecommunication network and an interface for connecting at least one machine device via at least one radio connection to the capillary network gateway, the method comprising:
   determining, by the capillary network gateway, a condition to switch into a power-saving mode;

instructing, in response to the condition being fulfilled, the at least one machine device to associate to a further capillary network gateway; and connecting the capillary network gateway to a further capillary network gateway via a radio connection.

2. The method of claim 1, wherein the condition is based on measuring a channel utilization of the capillary network gateway.

3. The method of claim 2, wherein channel utilization is determined based on averaging slot utilization over a predetermined time period.

4. The method of claim 1, wherein the condition is based on determining if the machine device associated to the capillary network gateway is able to be associated to the further capillary network gateway.

5. The method of claim 4, wherein the capillary network gateway measures a received field intensity of the of radio connection of the machine device and/or the further capillary network gateway to determine if the machine device is able to be associated to the further capillary network gateway.

6. The method of claim 4, wherein the capillary network gateway receives a message from the machine device indicating a received field intensity of the radio connection of the further capillary network gateway to determine if the machine device is able to be associated to the further capillary network gateway.

7. The method of claim 1, wherein a disconnect message is transmitted to the machine device for instructing the machine device to associate to the further capillary network gateway.

8. The method of claim 1, wherein the machine device is associated to the further capillary network gateway for a probing phase before disconnecting the machine device from the capillary network gateway.

9. The method of claim 1, wherein the capillary network gateway is switched into the power-saving mode.

10. The method of claim 9, wherein the capillary network gateway is subsequently switched into a regular power mode if channel utilization of the further capillary network gateway is above a predefined threshold value.

11. The method of claim 9, wherein the capillary network gateway is subsequently switched into a regular power mode if the minimum of an average received field intensity among machine devices associated to the further capillary network gateway in a predefined period is lower than a predefined threshold value.

12. The method of claim 1, wherein the capillary network gateway receives an external trigger signal for determining the condition.

13. The method of claim 1, wherein the capillary network gateway further disconnects from the base station of the mobile telecommunication network.

14. A capillary network gateway, comprising:
a first interface to a base station of a cellular network for connecting the capillary network gateway to a mobile telecommunication network;
a second interface for connecting at least one machine device via at least one radio connection to the capillary network gateway;
processing circuitry configured to cause the capillary network to:
determine a condition to switch into a power-saving mode;
instruct, in response to the condition being fulfilled, the at least one machine device to associate to a further capillary network gateway; and
connect the capillary network gateway to a further capillary network gateway via a radio connection.

15. A machine device for associating with a capillary network gateway via at least one radio connection, the machine device comprising:
processing circuitry;
memory containing instructions executable by the processing circuitry whereby the machine device is operative to:
transmit a message from the machine device to the capillary network gateway that indicates a received field intensity of a further capillary network gateway to determine if the machine device is able to be associated to the other capillary network gateway.

16. A non-transitory computer readable recording medium storing a computer program product for controlling capillary network gateway, the capillary network gateway comprising an interface to a base station of a cellular network for connecting the capillary network gateway to a mobile telecommunication network and an interface for connecting at least one machine device via at least one radio connection to the capillary network gateway, the capillary network gateway further comprising processing circuitry, the computer program product comprising software instructions which, when run on the processing circuitry of the capillary network gateway, causes the capillary network gateway to:
determine a condition to switch into a power-saving mode;
instruct, in response to the condition being fulfilled, the at least one machine device to associate to a further capillary network gateway; and
connect the capillary network gateway to a further capillary network gateway via a radio connection.

* * * * *